United States Patent
Ni

(10) Patent No.: US 10,848,658 B2
(45) Date of Patent: Nov. 24, 2020

(54) IMAGER SYSTEM WITH TWO SENSORS

(71) Applicant: New Imaging Technologies, Verrieres le Buisson (FR)

(72) Inventor: Yang Ni, Palaiseau (FR)

(73) Assignee: New Imaging Technologies (FR)

( * ) Notice: Subject to any disclaimer, the term of this patent is extended or adjusted under 35 U.S.C. 154(b) by 44 days.

(21) Appl. No.: 16/096,948

(22) PCT Filed: Apr. 24, 2017

(86) PCT No.: PCT/EP2017/059674
§ 371 (c)(1),
(2) Date: Oct. 26, 2018

(87) PCT Pub. No.: WO2017/186647
PCT Pub. Date: Nov. 2, 2017

(65) Prior Publication Data
US 2019/0124242 A1    Apr. 25, 2019

(30) Foreign Application Priority Data

Apr. 26, 2016  (FR) ...................................... 16 53672

(51) Int. Cl.
*H04N 5/225*     (2006.01)
*H04N 5/235*     (2006.01)
(Continued)

(52) U.S. Cl.
CPC ............. *H04N 5/2258* (2013.01); *G06T 7/80* (2017.01); *H04N 5/2351* (2013.01);
(Continued)

(58) Field of Classification Search
CPC .. H04N 5/2258; H04N 5/2351; H04N 5/2353; H04N 5/243; H04N 5/351; H04N 5/3535; H04N 5/35518; G06T 7/80
See application file for complete search history.

(56) References Cited

U.S. PATENT DOCUMENTS 8,022,994 B2    9/2011  Luo et al.
2008/0094481 A1 4/2008  Rai
(Continued)

FOREIGN PATENT DOCUMENTS

EP    2186318 A1    5/2010
EP    2775525 A1    9/2014
(Continued)

OTHER PUBLICATIONS

Darmont, Arnaud, "High Dynamic Range Imaging: Sensors and Architectures", The International Society for Optics and Photonics, Jan. 2013, 138 pages.
(Continued)

*Primary Examiner* — Nicholas G Giles
(74) *Attorney, Agent, or Firm* — Lerner, David, Littenberg, Krumholz & Mentlik, LLP

(57) ABSTRACT

The invention relates to an imager system comprising a main image sensor (1) and comprising a main matrix (2) of active pixels exhibiting a first instantaneous dynamic span of luminous sensitivity, and a main reading circuit adapted for reading the pixels of the main image sensor (1) and for acquiring a main image on the basis of said reading, an auxiliary image sensor (11) comprising a second matrix (12) of active pixels exhibiting a second instantaneous dynamic span of luminous sensitivity which is more extensive than the first instantaneous dynamic span of luminous sensitivity, and an auxiliary reading circuit adapted for reading the active pixels of the auxiliary image sensor (11) and for acquiring an auxiliary image on the basis of said reading, and a data processing unit (10) configured to determine at least one value of an acquisition parameter of the main image sensor on the basis of the auxiliary image.

14 Claims, 6 Drawing Sheets

Figure 2A:
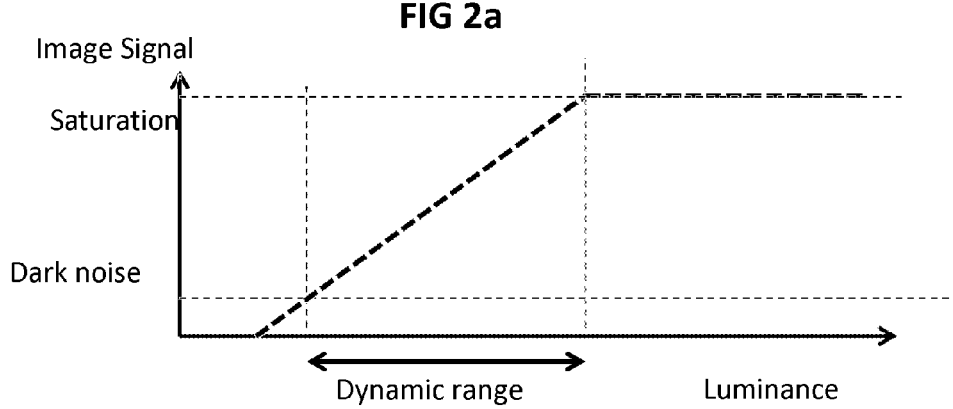

(51) Int. Cl.
  *H04N 5/351* (2011.01)
  *H04N 5/353* (2011.01)
  *H04N 5/355* (2011.01)
  *G06T 7/80* (2017.01)
  *H04N 5/243* (2006.01)

(52) U.S. Cl.
  CPC ........... *H04N 5/2353* (2013.01); *H04N 5/243* (2013.01); *H04N 5/351* (2013.01); *H04N 5/3535* (2013.01); *H04N 5/35518* (2013.01)

(56) References Cited

U.S. PATENT DOCUMENTS

| | | | |
|---|---|---|---|
| 2009/0309963 A1* | 12/2009 | Ogihara | G02B 21/365 348/79 |
| 2011/0025898 A1 | 2/2011 | Ni | |
| 2011/0140182 A1* | 6/2011 | Tanaka | H01L 27/14609 257/292 |
| 2011/0304746 A1 | 12/2011 | Iijima et al. | |
| 2014/0071330 A1* | 3/2014 | Zhang | H04N 5/2258 348/345 |
| 2014/0103189 A1 | 4/2014 | Chen et al. | |
| 2014/0117214 A1* | 5/2014 | Mellot | G01J 1/44 250/214 AL |
| 2014/0232929 A1 | 8/2014 | Ichikawa | |
| 2015/0249796 A1* | 9/2015 | Voronov | H04N 5/35581 348/208.6 |
| 2017/0257587 A1* | 9/2017 | Hatano | G02B 7/34 |

FOREIGN PATENT DOCUMENTS

| | | |
|---|---|---|
| WO | 2013121073 A1 | 8/2013 |
| WO | 2014042104 A1 | 3/2014 |

OTHER PUBLICATIONS

French Preliminary Search Report for FR Application No. 1653672, dated Dec. 13, 2016.

International Search Report for PCT/EP2017/059674, dated Jul. 20, 2017.

Kavusi, et al., "Architectures for High Dynamic Range, High Speed Image Sensor Readout Circuits", 2006 IFIP International Conference on Very Large Scale Integration, Oct. 2006, pp. 1-21.

* cited by examiner

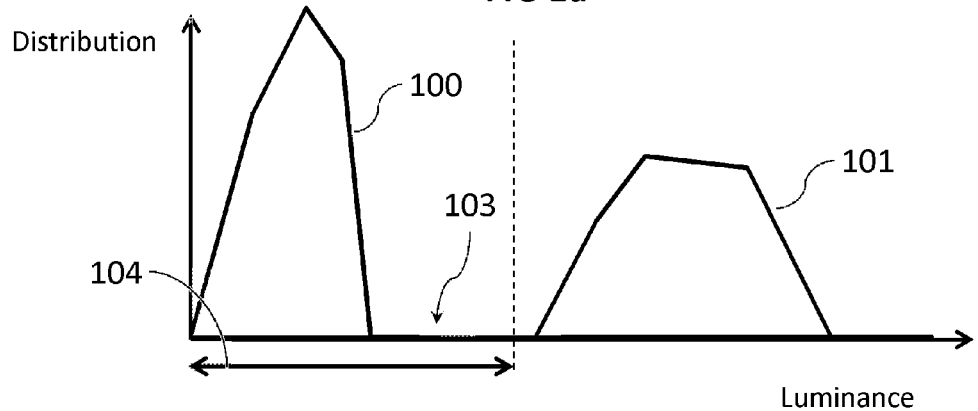
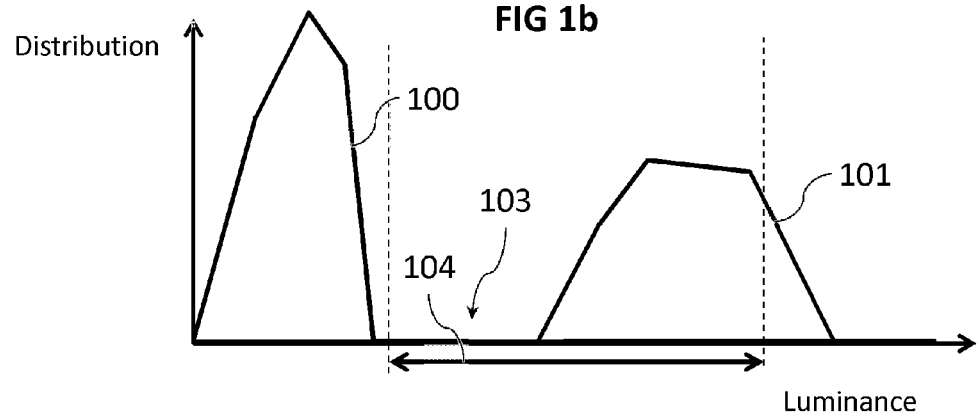
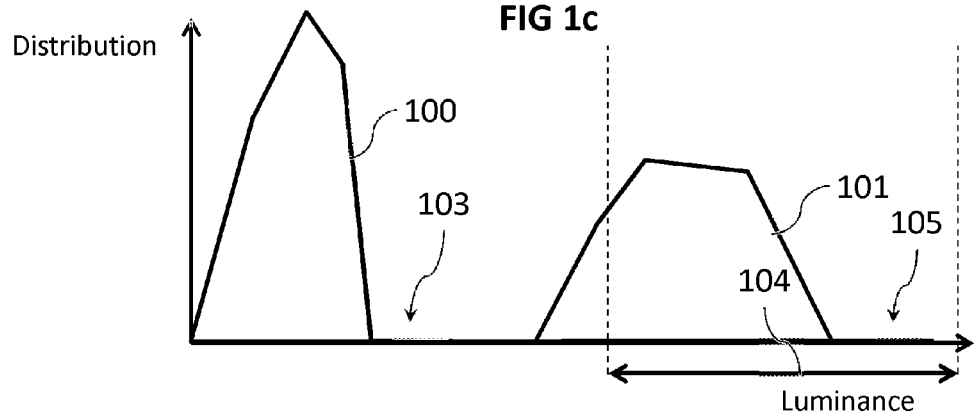

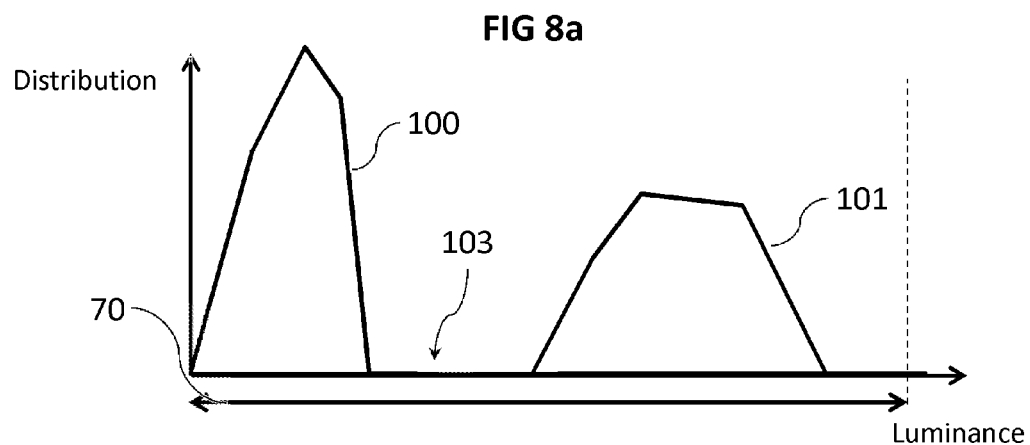
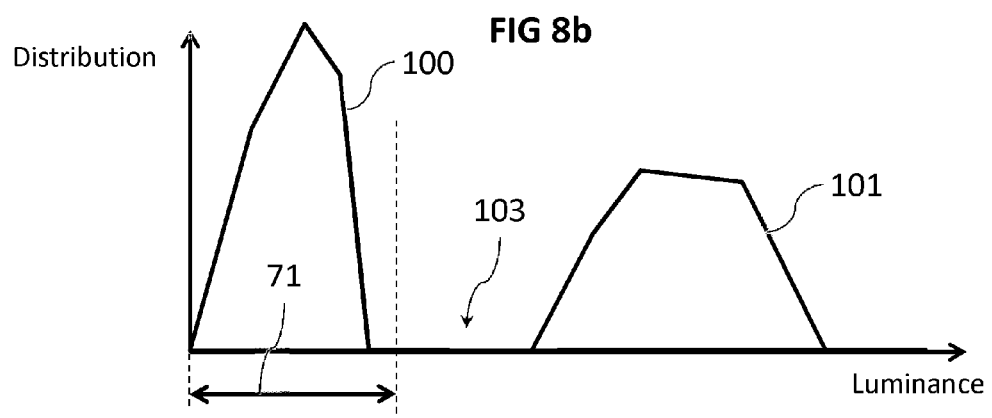
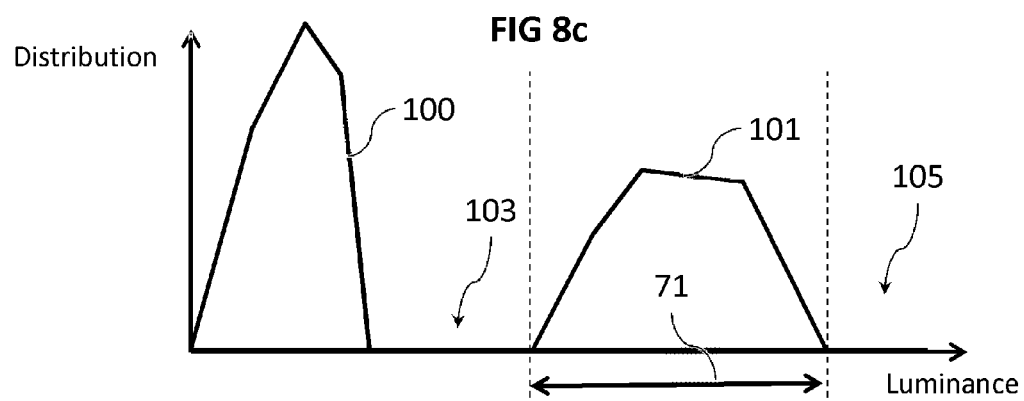

IMAGER SYSTEM WITH TWO SENSORS

CROSS-REFERENCE TO RELATED APPLICATIONS

The present application is a national phase entry under 35 U.S.C. § 371 of International Application No. PCT/EP2017/059674, filed Apr. 24, 2017, which claims priority from French Patent Application No. 1653672, filed Apr. 26, 2016, all of which are incorporated herein by reference.

BACKGROUND AND TECHNICAL FIELD OF THE INVENTION

The present invention relates to an imager system for acquiring an image having greater reactivity to the variation and distribution of light in a scene of an acquisition field.

Said imager system typically comprises an image sensor with an array of generally active pixels. The image sensor comprises a main readout circuit adapted to read the active pixels, after exposure of said active pixels, and to acquire an image from said readout.

Exposure of the active pixels to acquire an image takes place in accordance with several parameters, well known to photographers, having an impact on the image obtained and which must notably be adapted to the characteristics of the scene to be imaged and in particular to the luminance of the constituent elements of said scene.

This is particularly the case in respect of exposure time i.e. the time during which the active pixels are exposed to light, before readout of the active pixels. The term shutter speed is also used. Exposure time defines the amount of incident light to which the active pixels are exposed. Exposure time must therefore be adapted to the luminance of the elements in the scene but also to the light sensitivity of the active pixels.

An active pixel can be characterized by an instantaneous dynamic range of light sensitivity, which reflects the maximum amount of light that can be rendered by an active pixel and the amount of noise produced by this pixel in the dark. If the amount of light is too low, the read result of the active pixel contains much noise and therefore does not allow an image of sufficient quality to be obtained. If the amount of light is too high, the active pixel will saturate and the result of pixel readout will no longer render details of the object to be imaged.

Other parameters can be taken into consideration for the same reason, e.g. the amplification gain on leaving the array of active pixels, introduced by an adjustable amplifier. It is also possible to take into consideration a parameter of the optics placed on the light pathway in front of the active pixels, such as the diaphragm aperture or attenuation of an adjustable optical attenuator.

The constituent elements of a scene may have most diverse luminance values inside one of same acquisition field, at the same time or from one acquisition to another. For example, an image in the middle of the night does not have the same light distribution characteristics as an image in the middle of the day or at sunset. It is therefore important to adapt the image acquisition parameters to the luminance characteristics of the image acquisition field.

At the time of first exposure of the active pixels to the light of an acquisition field for which the luminance characteristics of the constituent elements are unknown to the system, standard acquisition parameters can be used. It is then possible that some highly luminous elements may lead to overexposure of some pixels which will saturate, or elements having low luminance may lead to underexposure of other pixels.

Analysis of the acquired image allows determination of a new set of acquisition parameters and a second image is then acquired with these new acquisition parameters. Said iterative loop allows the acquisition parameters to be adapted to the distribution and variation in luminosity of the scene. Patent application US2008/0094481A1 illustrates an example of this type of control. The task of image analysis is more burdensome the larger the size and high quality of the image.

FIGS. 1a, 1b and 1c illustrate a simplified example of application of this method, giving a contour curve of a histogram of an example of luminance distribution in an acquisition field. In this example, the luminance distribution of the scene in the acquisition field to be acquired contains luminous elements distributed between a first portion 100 of low luminance and a second portion 101 of high luminance, separated by a void portion 103 reflecting the absence of elements having mean luminance.

As illustrated in FIG. 1a, the instantaneous dynamic range 104 of the active pixels of the sensor, together with the initial acquisition parameters of the sensor (exposure time, aperture . . . ) allows rendering of most of the elements in the acquisition field having luminance belonging to the first portion 100. On the other hand, the elements having high luminance belonging to the second portion 101 have luminance that is too high for the active pixels of the sensor which saturate. Therefore, a first primary image shows overexposed areas reflecting the saturation of the active pixels.

The acquisition parameters are therefore modified to restrict the amount of light received by the active pixels to prevent saturation thereof, for example by reducing exposure time. Therefore, as illustrated in FIG. 1b, the instantaneous dynamic range 104 of the active pixels is moved towards stronger luminance values for rendering of elements that are too luminous for the initial parameters and which saturated the active pixels.

However, since the imager system has no information on the luminance of the luminous elements which saturate its pixels, modification of the acquisition parameters cannot be carried out as a function of the luminance of the most luminous elements. In general, the acquisition parameters are modified in accordance with pre-established rules, that are generally not adapted to luminance distribution specific to a scene, to prevent saturation of the pixels. The same procedure can be applied in reverse from the most luminous elements to the elements of lesser luminance.

It can be ascertained here that the instantaneous dynamic range 104 of the active pixels only covers part of the second portion 101. As a result, while come elements having luminance belonging to this portion 101 may appear in the acquired image, whereas previously the active pixels saturated, the elements in the second portion 101 having luminance which exceeds the instantaneous dynamic range 104 of the active pixels still continue to saturate the active pixels. In parallel, the instantaneous dynamic range 104 covers portion 103 although no luminous element has this luminance.

The acquisition parameters are then again modified to restrict the amount of light received by the active pixels to prevent saturation thereof, for example by reducing exposure time as previously. This new configuration is illustrated in FIG. 1c. However, since the sensor does not have information on the actual luminance of the elements which cause saturation of the active pixels, the instantaneous dynamic range 104 overlaps the first portion 101 and another portion 105 of greater luminance, although no luminous element has luminance corresponding to this other portion 105.

This procedure is repeated as many times as necessary until the acquisition parameters allow the instantaneous dynamic range 104 of the active pixels to cover the portions 100, 101 considered to represent the elements of the area of interest in the scene.

However, this technique suffers from several defects. First, it is noted that determination of acquisition parameters is obtained by "trial-and-error", by multiplying attempts. The scene of the acquisition field of a sensor can have most inhomogeneous luminance distribution, and this technique can lead to inadequate determination of acquisition parameters for several image acquisitions. It can be seen in FIG. 1*b* that portion 103 is covered whereas no luminous element has this luminance. The same applies to the other portion 105 in FIG. 1*c*.

This is a lengthy procedure, leading the acquisition of images that cannot be used or are redundant, and the constituent elements of the scene may vary and hence luminance distribution also. For example, in the preceding example, the first portion 101 could have moved towards the left (reflecting darkening of the most luminous elements) between two acquisitions, which brings into doubt the relevance of the preceding iterations.

In addition, when the light dynamics of a scene are high and exceed the dynamics of the image sensor, saturations and under-exposures occur despite the iterative control loop of acquisition parameters.

Several techniques have been put forward to improve the dynamics of imagers to prevent these saturations and under-exposures of a scene. These techniques can be listed as follows:
 1) multiple shots with different exposure times;
 2) application of different exposure times to sub-assemblies of pixels in a pixel array;
 3) creation of composite pixels combining photosensitive elements having different sensitivities, and particularly of different size;
 4) creation of a non-linear response having sensitivity that decreases with the amount of light received per pixel.

Method 1) is often used for scenes in which there is little movement. If there is movement of the elements in the scene, the images taken at different deferred exposure times are no longer correctly superimposed. Nonetheless this technique is often used in digital photographic equipment. The term generally used is HDRI for "high dynamic range imaging".

Method 2) is generally cabled in an image sensor. For example, in U.S. Pat. No. 8,022,994, the odd and even pixel lines have different exposure times, thereby forming two sub-images conveying brighter areas and darker areas, respectively. Image processing recombines these two images to produce a single image having greater dynamics. However, at times data loss can be ascertained if the exposure times are not adapted to the luminosity of the scene. If the pixels of one sub-group saturate or are under-exposed, they are no longer of any use and resolution can then be divided by a factor of up to two.

Method 3 is similar to method 2), except that differences in sensitivity replace differences in exposure times. The main advantage of this method is that there is no time shift between the two sub-images. In method 2), the use of two exposure times creates a time shift between the two shots for the sub-groups of pixels. Therefore, when an element is in movement in the acquisition field, it will not lie at the same position in the two sub-images. Method 3) allows this problem to be circumvented. However, one disadvantage of this method is that these different sensitivities are factory fixed and can no longer be later modified for adaptation to a particular scene. Patent application EP2775525A1 gives an example of implementation of this method.

Method 4) groups together many different procedures. Patent EP2186318 proposes a pixel having logarithmic response which practically overcomes the saturation phenomenon. Patent application US20140103189A1 proposes non-linear capacitance in a charge transfer pixel allowing piece linear response. However, these pixels are generally more complex than a simple active pixel and also bulkier, and are not suitable for pixel arrays of high density and small pitch. The solution proposed by EP2186318 remains an excellent solution for arrays of medium and low density (less than one million pixels) since it fully obviates control of exposure time without any saturation problem.

Figure 2B:
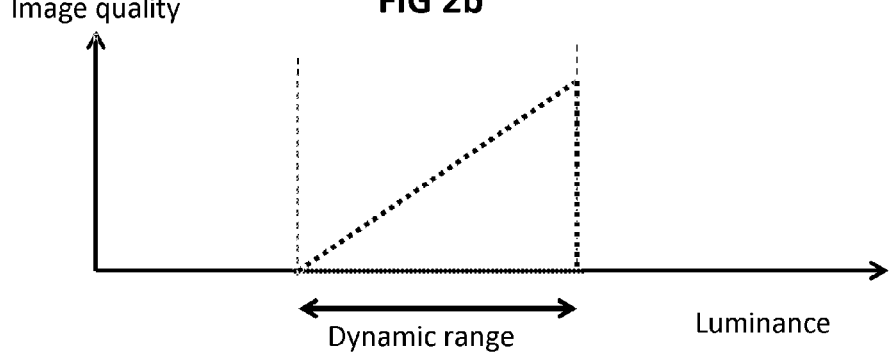
Figure 2C:
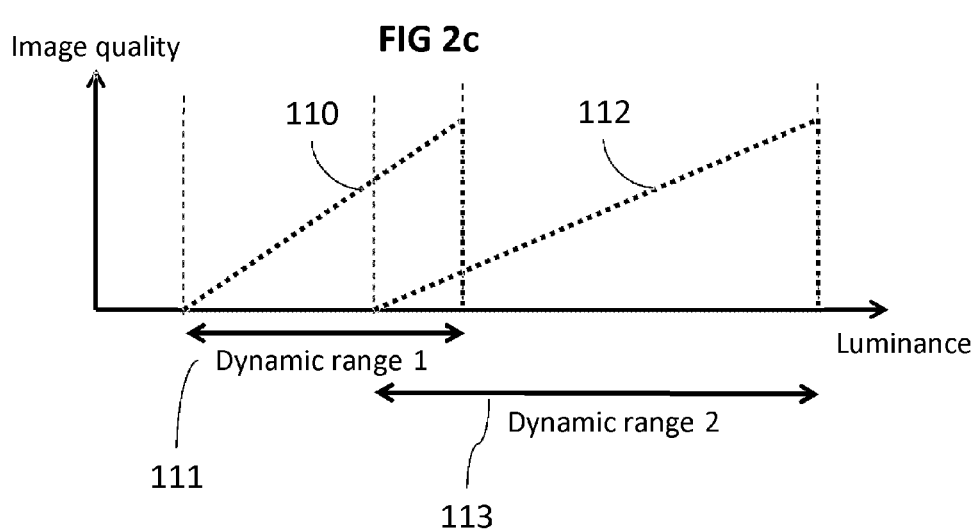

FIGS. 2*a*, 2*b* and 2*c* illustrate the relationship between sensor dynamics, quality and exposure time. FIG. 2*a* illustrates the definition of operating dynamics by showing the dependency of the image signal on the luminance of the elements in the acquisition field for a given exposure time. It can be seen that the image signal leaving a pixel increases with luminance and saturates at a certain high value known as the saturation value. An image signal can start to be observed when it exceeds the dark noise of the pixel. The dynamic range can therefore be defined as being the luminance range over which the image signal leaving the pixel is between dark noise and saturation.

FIG. 2*b* illustrates the quality of an image perceived on leaving a pixel as a function of luminance. When luminance is lower than the dynamic range, the image signal cannot be distinguished from dark noise. Quality is therefore zero. In the dynamic range, image quality improves with luminance. Beyond the dynamic range. however, quality becomes zero after saturation.

FIG. 2*c* illustrates image quality as a function of luminance when different exposure times are used. The first curve 110 illustrates image quality for a first, relatively long exposure time t1. The second curve 112 illustrates image quality for a shorter exposure time t2 than exposure time t1. This results in a first dynamic range 111 corresponding to the first curve 110 and a second dynamic range 113 corresponding to the second curve 112. On account of its shorter exposure time, the second dynamic range 113 is broader than the first dynamic range 111 and corresponds to higher luminance values.

It is ascertained that the longer exposure time t1 allows obviating of dark noise with lesser luminance, but also that saturation is reached with less luminance. A shorter exposure time such as t2 produces contrary effects. It can be seen in FIG. 2*c*, that if two exposure times are used, acquisition dynamics are widened when exposure times are correctly configured. However, if exposure times are too far apart a luminance «hole» may be formed between the respective dynamic ranges associated with the two exposure times. The details of elements in the acquisition field having luminance that falls into this «hole» are lost.

Therefore, even though sensors provided with multiple exposure times have long been available, the image capture performance of imagers under difficult dynamic conditions remains unsatisfactory. In particular, emerging applications having recourse to artificial intelligence such as automatic vehicle drive, assisted driving, automatic monitoring, etc. . . . require imagers to be capable of quality image acquisition under all conditions.

SUMMARY OF THE INVENTION

It is the objective of the invention to overcome at least some and preferably all these disadvantages by proposing the use of a high dynamic pixel sensor, such as described in EP2186318 for example, to determine a set of optimized parameters for a high resolution sensor.

There is therefore proposed an imager system comprising a main image sensor having a first acquisition field and comprising a main array of active pixels having a first instantaneous dynamic range of light sensitivity, and a main readout circuit adapted to read the pixels of the main image sensor after exposure of said pixels and to acquire a main image from said readout, said imager system comprising:

an auxiliary image sensor having a second acquisition field covering the first acquisition field at least in part, and comprising a second array of active pixels having a second instantaneous dynamic range of light sensitivity wider than the first instantaneous dynamic range of light sensitivity, and an auxiliary readout circuit adapted to read the active pixels of the auxiliary image sensor after exposure of said active pixels and to acquire an auxiliary image from said readout; and a data processing unit configured to determine at least one value of an acquisition parameter for the main image sensor from the auxiliary image.

The auxiliary image sensor allows the acquisition of an auxiliary image have little or no saturation or under-exposure (by means of a wider dynamic functioning range), thereby allowing best determination of an acquisition parameter for the main image sensor so that acquisition conditions of the main image are best adapted to the scene in the acquisition field.

This imager system is advantageously completed by the following characteristics taken alone or in any technically possible combination thereof:

the data processing unit is configured to determine a spatial distribution of luminosity in the auxiliary image, and the data processing unit is configured to determine—as acquisition parameter of the main image—at least the exposure time of the active pixels of the main image sensor and/or an amplification gain of the mean readout circuit from the spatial distribution of luminosity in the auxiliary image;

the width of the second instantaneous dynamic range of light sensitivity is twice greater than the width of the first instantaneous dynamic range of light sensitivity;

the main array of the main image sensor has a pixel density that is twice higher than the density of the active pixels of the array of active pixels of the auxiliary image sensor;

the pixels of the main array of the main image sensor and the active pixels of the auxiliary array of the auxiliary image sensor are interleaved on the surface of one same substrate;

the pixels of the main array of the main image sensor are arranged on a first substrate and the active pixels of the auxiliary array of the auxiliary image sensor are arranged on a second substrate separate from the first substrate;

the auxiliary image sensor has non-linear voltage response to light exposure in the first instantaneous dynamic range of light sensitivity;

the active pixels of the auxiliary image sensor have aperiodic spatial distribution;

the active pixels of the auxiliary image sensor are pixels with logarithmic response;

the active pixels of the auxiliary image sensor are pixels having a counter adapted to accumulate charges on exposure and to count the number of times when charge accumulation reaches an accumulation reset threshold;

the active pixels of the auxiliary image sensor are discharge pixels adapted to discharge on exposure for a discharge time that is function of the luminance of exposure;

the auxiliary image sensor is provided with a colour filter array, and the data processing unit is configured to determine at least the white balance from the auxiliary image as acquisition parameter for the main image;

the data processing unit is configured to determine several different values of an acquisition parameter for the main image sensor from the auxiliary image, and the main image sensor is configured to acquire several main images using a different value of the acquisition parameter for each of said main images.

The invention also concerns a method for acquiring an image by means of an imager system according to the invention, said method comprising the steps whereby:

the auxiliary image sensor acquires an auxiliary image, the data processing unit determines at least one value of an acquisition parameter for the main image sensor from the auxiliary image, the main image sensor acquires at least one main image using said value of the acquisition parameter.

In one embodiment, the data processing unit determines several different values of an acquisition parameter for the main image sensor from the auxiliary image, and the main image sensor acquires several main images using a different value of the acquisition parameter for each of said main images.

PRESENTATION OF THE FIGURES

Figure 3:
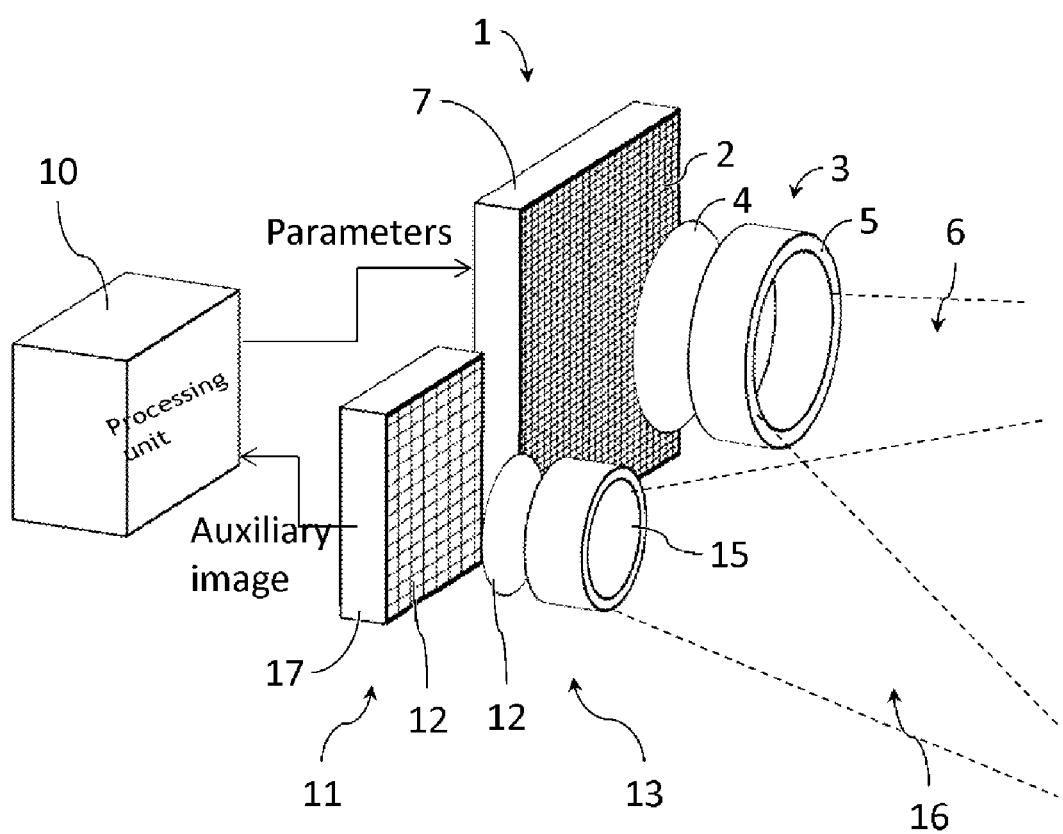
Figure 4:
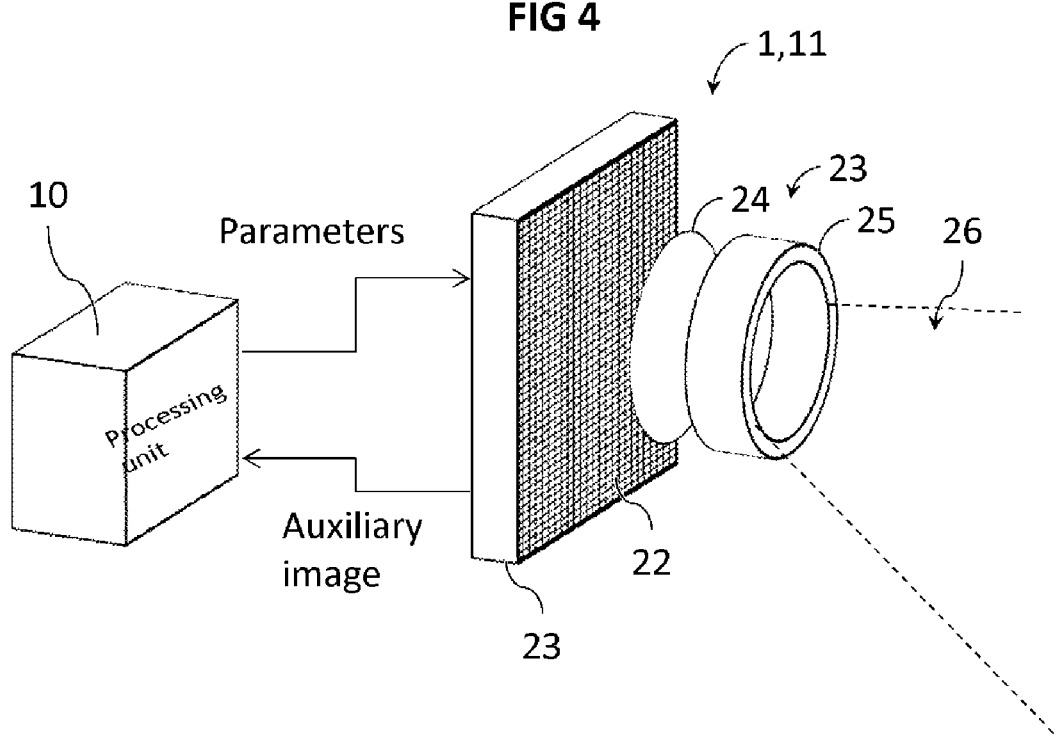
Figure 5:
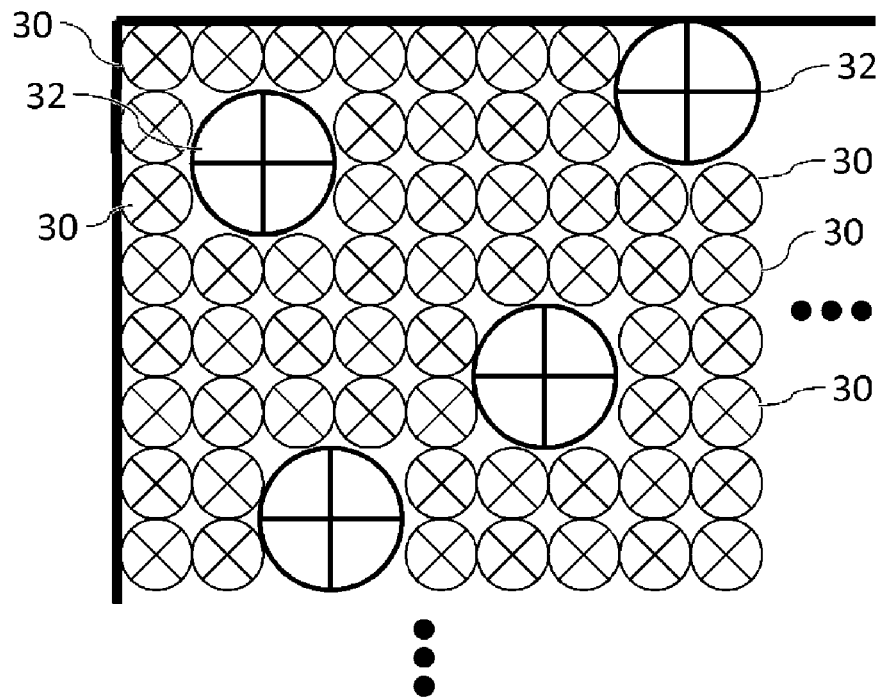
Figure 6:
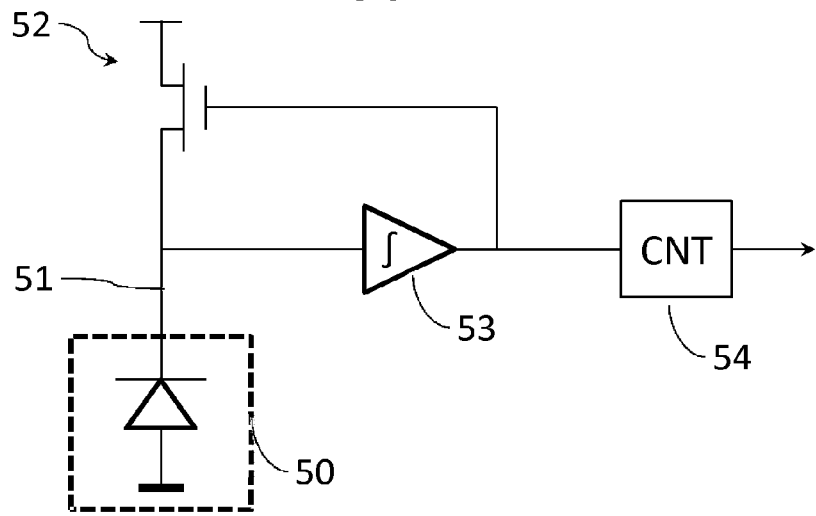
Figure 7:
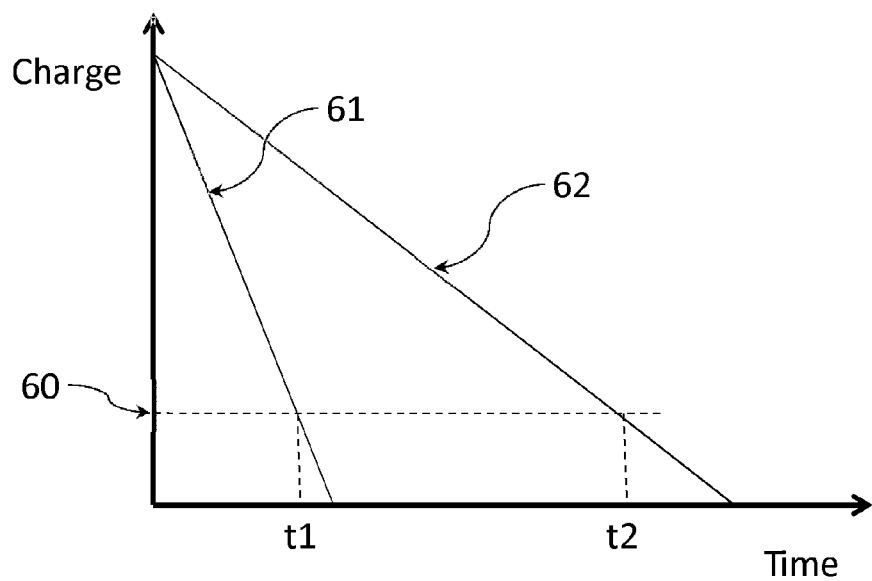

The invention will be better understood by means of the following description relating to embodiments and variants of the present invention, given as nonlimiting examples and explained with reference to the appended schematic drawings in which:

FIGS. 1a, 1b, 1c, already discussed, illustrate the multi-exposure technique by means of a contour curve of an exemplary histogram of luminance distribution in an acquisition field;

FIGS. 2a, 2b, 2c, already discussed, illustrate the response of a pixel with linear photoelectric response and the definition of the dynamic functioning range, image quality with a given exposure time and changes in image quality as a function of exposure time;

FIG. 3 schematically illustrates an imager system according to one possible embodiment of the invention, in which the two sensors are juxtaposed and formed on different substrates;

FIG. 4 schematically illustrates an imager system according to one possible embodiment of the invention, in which the two sensors have arrays of active pixels that are interleaved with each other;

FIG. 5 schematically illustrates a detail of an example of interleaving between the two arrays of active pixels;

FIG. 6 schematically illustrates an example structure of an example of an active pixel circuit provided with a counter;

FIG. 7 schematically illustrates examples of charge decrease curves in an active pixel;

FIGS. 8a, 8b, 8c illustrate the implementation of one embodiment of the invention in the case illustrated in FIGS. 1a to 1c.

In all the Figures, similar elements are designated by same references.

DETAILED DESCRIPTION

In the present description, by image is meant a set of data representing a spatially distributed representation in two dimensions of at least one optical characteristic, typically luminance, of elements in a scene, said data being spatially organized according to said spatial representation. In the following description, the main array of the main image sensor is composed of active pixels. Other configurations can be used, for example with pixels other than active pixels for the main array.

With reference to FIG. 3 illustrating an example of an imager system according to one possible embodiment of the invention, the imager system comprises a main image sensor 1 comprising a main array 2 of active pixels having a first instantaneous dynamic range of light sensitivity. The imager system also comprises a main readout circuit adapted to read the active pixels of the main image sensor 1 after exposure of said active pixels and to acquire a main image from said readout.

The main image sensor may particularly be a sensor provided with possible implementation of multiple exposure times that can either be implemented as separate shots and mixed together in a single shot, according to the conditions set forth above, in particular for methods 1) and 2) already mentioned.

Each active pixel comprises a photodetector e.g. a photodiode, and an active amplifier. It may be a conventional three-transistor, four-transistor active pixel or other configuration. Preferably, for reasons of compactness, each active pixel is a four-transistor pixel the output amplifier of which is shared by several photodiodes.

The main image sensor 1 also comprises optics 3 comprising usual components for image capture such as a lens 4 for example or lens assembly 5 equipped with a diaphragm or shutter. The optics 3 can be controlled in particular by acquisition parameters such as exposure time or diaphragm aperture which control the amount of light received by the active pixels.

The main image sensor 1 has a first acquisition field 6 which extends from the optics 3. In the acquisition field 6 there is a scene composed of different elements of varied luminance. When the active pixels of the main array 2 are exposed, the light emitted/reflected by these different elements of the scene passes through the optics 3 and reaches the active pixels of the main array 2. The amount of incident light on the active pixels is dependent on exposure time and the characteristics of the optics 3, and in particular on aperture size.

The main array 2 is formed on a substrate 7 which typically contains the main readout circuit. The electrical characteristics of the active pixels vary with the amount of incident light during exposure. On readout of these active pixels, the main readout circuit measures the electrical characteristics of each of active pixel and thereby acquires a main image representing the amount of incident light on each active pixel.

The imager system also comprises an auxiliary image sensor 11 having a second acquisition field 16 overlapping the first acquisition field 6 at least in part. It is preferable that the first acquisition field 6 and second acquisition field 16 have maximum coincidence, for example more than 80%, in particular at more than ten centimetres from the imager system which is generally a minimum distance for image capture. Good superimposition of the acquisition fields can be obtained by placing the sensors adjacent to each other with parallel or converging optical axes. Preferably, the second acquisition field 16 and the first acquisition field can be the same, which can be obtained by using the same optics for the two sensors 1, 11 and in particular by using an image return device such as a mirror.

The second array 12 of active pixels has a second instantaneous dynamic range of light sensitivity that is wider than the first instantaneous dynamic range of light sensitivity. Preferably, the width of the second instantaneous dynamic range of light sensitivity is twice larger than the width of the first instantaneous dynamic range of light sensitivity, and further preferably ten times the width of the first instantaneous dynamic range of light sensitivity.

The width of an instantaneous dynamic range of light sensitivity can simply be determined be evidencing the limits thereof with fixed acquisition parameters. For the lower limit, first the noise affecting the sensor under test conditions is determined: the sensor is placed in the dark, an image is acquired and from the values of the pixels in the acquired image, a noise level is statistically determined. The lower limit of the instantaneous dynamic range of light sensitivity corresponds to the luminance of the elements in the acquisition field which allows a pixel value higher than this noise level to be obtained.

The upper limit corresponds to the luminance of the elements in the acquisition field on and after which the active pixels start to saturate. It is also possible to infer the instantaneous dynamics of the active pixels by calculating the ratio of the two limits, determined as explained above.

The auxiliary image sensor 11 also comprises optics 13 comprising usual components for image capture such as a lens 14 for example or lens assembly 15 equipped with a diaphragm or shutter. The optics 13 can be controlled in particular by acquisition parameters such as exposure time or diaphragm aperture which will control the amount of light received by the active pixels. However, simplified optics having a lens with fixed aperture may suffice.

Similar to the first sensor 1, the second sensor comprises an auxiliary readout circuit adapted to read the active pixels of the auxiliary image sensor 11 after exposure of said active pixels, and to acquire an auxiliary image from said readout. Similar to the main image sensor 1, the auxiliary array 12 is formed on a substrate 17, which typically comprises the auxiliary readout circuit. The electrical characteristics of the active pixels vary with the amount of incident light during exposure. On reading these active pixels, the auxiliary readout circuit measures the electrical characteristics of each active pixel and thereby acquires the auxiliary image representing the amount of incident light on each active pixel.

The auxiliary image sensor 11 is therefore used to acquire an auxiliary image before acquisition of a main image by the main image sensor 1 so that at least one acquisition parameter for the main image sensor is determined from this auxiliary image and can be used to acquire the main image.

For this purpose, the imager system also comprises a data processing unit 10 configured to determine at least one value of an acquisition parameter for the main image sensor from the auxiliary image. For example, this acquisition parameter can be exposure time and/or diaphragm aperture, and/or amplification gain of the main readout circuit and/or optical attenuation of an optical attenuator and/or white balance. The processing unit 10 is therefore connected both with the auxiliary image sensor 11 to receive the auxiliary image and with the main image sensor 1 to provide the latter with the value of the acquisition parameter.

In particular, the data processing unit 10 can be configured to determine a spatial distribution of luminosity in the auxiliary image and to determine, as value of the acquisition parameter of the main image, at least one exposure time of the active pixels of the main image sensor 1 and/or an amplification gain of the main readout circuit from the spatial distribution of luminosity inferred from the auxiliary image.

The method for acquiring an image by means of an imager system according to any of the possible embodiments therefore comprises the steps whereby:

the auxiliary image sensor 11 acquires an auxiliary image, the data processing unit 10 determines at least one value of an acquisition parameter for the main image sensor 1 from the auxiliary image, the main image sensor 1 acquires a main image using said value of the acquisition parameter.

Insofar as the auxiliary image is essentially used to determine the value of an acquisition parameter for the main image sensor 1, the resolution of the auxiliary image does not need to be as high as the resolution of the main image. It follows that the density of active pixels in the auxiliary image sensor 11 does not need to be as high as the density of active pixels in the main image sensor 1.

Therefore, the main array 2 of the main image sensor 1 may have a density of active pixels twice higher than the density of the active pixels in the array 12 of active pixels of the auxiliary image sensor 11, even preferably ten times higher than the density of the active pixels in the array 12 of active pixels of the auxiliary image sensor 11. In terms of number of pixels, the main array 2 of the main image sensor 1 may have a number of active pixels higher than ten times the number of active pixels in the array 12 of active pixels of the auxiliary image sensor 11, even preferably higher than one hundred times the number of active pixels in the array 12 of active pixels of the auxiliary image sensor 11.

Low resolution for the auxiliary image reduces the burden of processing applied by the processing unit, and in particular therefore allows accelerated analysis of the auxiliary image. This low resolution also allows the advantageous use of logarithmic pixels without saturation and without control over image capture parameters as proposed by patent EP2186318.

The auxiliary image sensor 11 has sufficient resolution however to allow fine analysis of the auxiliary image. Therefore, the array 12 of active pixels in the auxiliary image sensor 11 preferably has a number of active pixels higher than 320×240 pixels, and preferably higher than one thousandth, even one hundredth of the active pixels in the main array 2 of the main image sensor 1.

It is possible to provide the auxiliary image sensor with a colour filter array (CFA). This colour filter array is composed of small colour filters positioned in front of the photosensitive elements of the active pixels of the auxiliary image sensor. It is then possible to determine the distribution of luminance in different colours. In this case, the data processing unit 10 can be configured to determine at least the white balance from the auxiliary image as acquisition parameter for the main image.

In the example in FIG. 3, the main image sensor 1 and the auxiliary image sensor 11 are spatially separate and shown side by side. The active pixels of the main array 2 of the main image sensor 1 are arranged on a first substrate 7 and the active pixels of the auxiliary array 12 of the auxiliary image sensor 1 are arranged on a second substrate 17 separate from the first substrate 7. This configuration has the advantage that it is possible to work with main and auxiliary sensors from different manufacturers.

However, said configuration is not necessary. To simplify the structure of the imager system, and with reference to FIG. 4 and FIG. 5, it is possible to determine which from among the active pixels 30 of the main array 2 of the main image sensor 1 and the active pixels of 32 of the auxiliary array 12 of the auxiliary image sensor 11 are to be interleaved on the surface of one same substrate 23. The main array 2 and the auxiliary array 12 then lie in one same plane. The main array 2 and the auxiliary array 12 then form a common array 22.

The two sensors 1, 11 having interleaved arrays share the same common optics 23, for example with a common lens 24 and a common lens assembly 24, and therefore the same common acquisition field 26 which therefore forms both the first acquisition field and the second acquisition field. However, each image sensor 1, 11 can maintain a readout circuit dedicated to their respective active pixels.

FIG. 5 shows an example of the organization of the active pixels in this case. An example of the spatial organization is illustrated therein of the active pixels 30, 32 in the common array 22. First active pixels 30 correspond to the active pixels of the main array 2 of the main image sensor 1, whilst second active pixels 32 correspond to the active pixels of the auxiliary array 12 of the auxiliary image sensor 11 and are distributed between active pixels 30 of the main image sensor 11. It is to be noted that the second active pixels 32 are shown to be larger here than the first active pixels 30, which is usual for high dynamic active pixels. This is not compulsory however, and the second active pixels 32 could be of similar size for example as the first active pixels 30.

As previously, it is to be noted that the number of active pixels 30 of the main image sensor 1 is much higher, at least twice higher and preferably at least ten times higher than the number of active pixels 32 of the auxiliary image sensor 11. Preferably, the active pixels 32 of the auxiliary image sensor 11 are not adjacent to each other but are individually isolated from each other by active pixels 30 of the main image sensor 11. Also preferably, the active pixels 32 of the auxiliary image sensor 12 have aperiodic spatial distribution to prevent the creation of geometric effects such as a moiré effect, and therefore do not have symmetrical distribution within the active pixels 30 of the main image sensor 11.

As indicated above, the active pixels of the main image sensor 1 are of the type commonly used in imagers to obtain high definition images, e.g. three-transistor or four-transistor active pixels. The active pixels 30 of the main image sensor 1 and the active pixels 32 of the auxiliary image sensor 11 differ in their different instantaneous dynamic ranges of light sensitivity.

To obtain active pixels 32 of the auxiliary image sensor 11 having a second instantaneous dynamic range of light sensitivity that is substantially wider than that of the active pixels 30 of the main image sensor 1, several solutions are possible.

Whereas the main image sensor 1 generally has linear voltage response at least in part to light exposure in the first instantaneous dynamic range of light sensitivity, the auxiliary image sensor 2 preferably has non-linear voltage response to light exposure in the first instantaneous dynamic range of light sensitivity.

It is possible to obtain this non-linearity by using pixels with logarithmic response as active pixels 32 of the auxiliary image sensor 12. For example, patent EP2186318 proposes an active pixel structure of CMOS type that can be used. Other configurations of logarithmic response pixels can be used. Since the active pixels have logarithmic response, their response scarcely changes with luminosity and therefore allows saturation to be prevented. In this manner, a near-infinite instantaneous dynamic range of light sensitivity can be obtained.

FIG. 6 illustrates an example of another possibility. The active pixel of the auxiliary image sensor 11 here is a pixel with a counter adapted to accumulate charges on exposure and to count the number of times when charge accumulation reaches an accumulation reset threshold. A photodiode 50 is connected via a node 51 to the drain of a reset transistor 52. An integrator 53 is connected to the node 51 and integrates the voltage at the terminals of the photodiode 50. The result of this integration is applied to the gate of the transistor 52. When the result of integration reaches a sufficient value, the transistor 52 becomes conducting and resets the photodiode 53. A counter 54 configured to count the number of times a threshold is overstepped gives information on the number of cycles. Other configurations are evidently possible, in particular to adapt the threshold or resetting. The publication «Architectures for High Dynamic Range, High Speed Image Sensor Readout Circuits» by S. Kavusi et al. in «2006 IFIP International Conference on Very Large Scale Integration» gives further technical details on this type pixel with high dynamic functioning.

FIG. 7 illustrates another approach in which the active pixels 32 of the auxiliary image sensor 12 are discharge pixels adapted to discharge on exposure for a discharge time that is function of the luminance of exposure. Here two examples of discharges 61, 62 are illustrated, respectively corresponding to exposure to strong luminance and exposure to low luminance.

For the first exposure, to strong luminance, discharge 61 takes place rapidly so that the charge threshold 60 is soon reached after a short time t1. For the second exposure, to low luminance, discharge 62 occurs more slowly so that the charge threshold 60 is reached after a time t2 longer than time t1. The signal corresponding to the luminance of exposure can then be determined as being proportional to the inverse of discharge time. Therefore, the signal for exposure to strong luminance 1/t1 is greater than the signal for exposure to low luminance 1/t2. High dynamics are possible if timing is sufficiently fine-tuned.

Other technical solutions to extend the dynamic range can be found for example in the work "High Dynamic Range Imaging: Sensors and Architectures", by Arnaud Darmont, 2013, ISBN 9780819488305.

The large width of the second instantaneous dynamic range of light sensitivity allows improved acquisition of the main image by means of the auxiliary image. For this purpose, the data processing unit 10 is configured to determine at least one value of an acquisition parameter for the main image sensor from the auxiliary image.

It is also possible to acquire several main images from one same auxiliary image. For this purpose, the data processing unit 10 is configured to determine several different values of an acquisition parameter for the main image sensor 1 from the auxiliary sensor, and the main image sensor is configured to acquire several main images using a different value of the acquisition parameter for each of said main images.

FIGS. 8a, 8b and 8 reproduce the case illustrated in FIGS. 1a to 1c, by applying thereto an example of embodiment of the invention in which two main images are acquired using different values of one same acquisition parameter, determined from the same auxiliary image.

FIG. 8a illustrates the acquisition of the auxiliary image by the auxiliary image sensor 11. On account of their wide instantaneous dynamic range of light sensitivity 70, the active pixels of the auxiliary image sensor 11 are capable of capturing the light from all the elements contained in the second acquisition field 16, whether these elements belong to the first low-luminance portion 100 or to the second high-luminance portion 101. The auxiliary image resulting from this acquisition is analysed by the processing unit 10 which is able to identify the two assemblies formed by portions 100 and 101.

The processing unit then determines at least one value of an acquisition parameter so that the first instantaneous dynamic range of light sensitivity 71 of the active pixels of the main image sensor best corresponds to the luminance of the elements belonging to the first portion 100, as illustrated in FIG. 8b. It can be seen here that the first instantaneous dynamic range of light sensitivity 71 only scarcely covers the portion of luminance 103 that is not shown by any element. A first main image can therefore be acquired for the elements having luminance corresponding to the first portion 100.

From the same auxiliary image, the processing unit also determines at least one acquisition parameter so that the first instantaneous dynamic range of light sensitivity 71 of the active pixels of the main image sensor best correspond to the luminance of the elements belonging to portion 101, as illustrated in FIG. 8c. It can be seen here that the first instantaneous dynamic range of light sensitivity 71 is centred on the second portion 101 that it covers. There is therefore no saturation of the active pixels, nor overlapping of luminance portions 103, 105 not containing any element. A second main image can therefore be acquired.

With the invention it was therefore possible with two main images to capture all the elements in the first acquisition field 6, ensuring that there is no pixel saturation and therefore no loss of information.

It can be seen that these two exposures indeed form a «hole» in the luminance scale between the dynamic ranges in FIGS. 8b and 8c. However, this hole is judiciously positioned in the portion of luminance 103 where there is no element, made possible by analysis of the high dynamic auxiliary image. The result is optimal use of image acquisitions and hence a savings in time and resources.

The invention is not limited to the embodiment described and illustrated in the appended Figures. Modifications remain possible, in particular regarding the composition of the various elements or via substitution of technical equivalents, without departing from the protected scope of the invention.

The invention claimed is:

1. Imager system comprising a main image sensor having a first acquisition field and comprising a main array of active pixels having a first instantaneous dynamic range of light sensitivity, and a main readout circuit adapted to read the pixels of the main image sensor after exposure of said pixels and to acquire a main image from said readout, wherein the main image sensor has a voltage response that is at least in part linear to light exposure in the first instantaneous dynamic range of the light sensitivity, wherein the imager system comprises:
an auxiliary image sensor having a second acquisition field covering at least in part the first acquisition field, and comprising a second array of active pixels having a second instantaneous dynamic range of light sensitivity wider than the first instantaneous dynamic range of light sensitivity, and an auxiliary readout circuit adapted to read the active pixels of the auxiliary image sensor after exposure of said active pixels and to acquire an auxiliary image from said readout, wherein the auxiliary image sensor has a non-linear voltage response to light exposure in the first instantaneous dynamic range of light sensitivity, and a data processing unit configured to determine at least one value of an acquisition parameter for the main image sensor from the auxiliary image.

2. The imager system according to claim 1, wherein the data processing unit is configured to determine a spatial distribution of luminosity in the auxiliary image, and wherein the data processing unit is configured to determine—as acquisition parameter of the main image—at least the exposure time of the active pixels of the main image sensor and/or an amplification gain of the main readout circuit from the spatial distribution of luminosity in the auxiliary image.

3. The imager system according to claim 1, wherein the width of the second instantaneous dynamic range of light sensitivity is twice greater than the width of the first instantaneous dynamic range of light sensitivity.

4. The imager system according to claim 1, wherein the main array of the main image sensor has a pixel density that is twice higher than a pixel density of the active pixels of the array of active pixels of the auxiliary image sensor.

5. The imager system according to claim 1, wherein the pixels of the main array of the main image sensor and the active pixels of the auxiliary array of the auxiliary image sensor are interleaved on a surface of one same substrate.

6. The imager system according to claim 1, wherein the pixels of the main array of the main image sensor are arranged on a first substrate and the active pixels of the auxiliary array of the auxiliary image sensor are arranged on a second substrate separate from the first substrate.

7. The imager system according to claim 1, wherein the active pixels of the auxiliary image sensor have aperiodic spatial distribution.

8. The imager system according to claim 1, wherein the active pixels of the auxiliary image sensor are pixels with a logarithmic response.

9. The imager system according to claim 1, wherein the active pixels of the auxiliary image sensor are pixels having a counter adapted to accumulate charges on exposure and to count the number of times when charge accumulation reaches an accumulation reset threshold.

10. The imager system according to claim 1, wherein the active pixels of the auxiliary image sensor are discharge pixels adapted to discharge on exposure for a discharge time that is function of the luminance of exposure.

11. The imager system according to claim 1, wherein the auxiliary image sensor is provided with a colour filter array, and the data processing unit is configured to determine at least the white balance from the auxiliary image as acquisition parameter for the main image.

12. The imager system according to claim 1, wherein the data processing unit is configured to determine several different values of an acquisition parameter for the main image sensor from the auxiliary image, and the main image sensor is configured to acquire several main images using a different value of the acquisition parameter for each of said main images.

13. Method for acquiring an image by means of an imager system according to claim 1, said method comprising the steps whereby:

the auxiliary image sensor acquires an auxiliary image, the data processing unit determines at least one value of an acquisition parameter for the main image sensor from the auxiliary image, the main image sensor acquires at least one main image using said value of the acquisition parameter.

14. The method according to claim 13, wherein the data processing unit determines several different values of an acquisition parameter for the main image sensor from the auxiliary image, and wherein the main image sensor acquires several main images using a different value of the acquisition parameter for each of said main images.

* * * * *